United States Patent
Costa et al.

(10) Patent No.: US 11,612,898 B2
(45) Date of Patent: Mar. 28, 2023

(54) CATIONIC POLYMER SELECTIVE DEPRESSANTS AND USE THEREOF IN MINERAL ORE PURIFICATION METHODS

(71) Applicant: KEMIRA OYJ, Helsinki (FI)

(72) Inventors: Marcelo Moreira Costa, Barueri (BR); Xihui Yin, Marietta, GA (US); Sergio Cabo, Rio de Janeiro (BR)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 16/329,404

(22) PCT Filed: Aug. 30, 2017

(86) PCT No.: PCT/US2017/049364
§ 371 (c)(1),
(2) Date: Feb. 28, 2019

(87) PCT Pub. No.: WO2018/045025
PCT Pub. Date: Mar. 8, 2018

(65) Prior Publication Data
US 2019/0217311 A1 Jul. 18, 2019

Related U.S. Application Data

(60) Provisional application No. 62/381,963, filed on Aug. 31, 2016.

(51) Int. Cl.
| | |
|---|---|
| *B03D 1/016* | (2006.01) |
| *B03D 1/06* | (2006.01) |
| *C02F 1/24* | (2023.01) |
| *C08F 220/34* | (2006.01) |
| *C08F 220/56* | (2006.01) |
| *C08G 59/10* | (2006.01) |
| *C08L 39/04* | (2006.01) |
| *C08L 79/02* | (2006.01) |
| *B03D 1/00* | (2006.01) |
| *C02F 103/10* | (2006.01) |
| *B03D 1/01* | (2006.01) |
| *C02F 1/56* | (2023.01) |
| *C02F 101/20* | (2006.01) |

(52) U.S. Cl.
CPC ............... *B03D 1/016* (2013.01); *B03D 1/00* (2013.01); *B03D 1/06* (2013.01); *C02F 1/24* (2013.01); *C08F 220/34* (2013.01); *C08F 220/56* (2013.01); *C08G 59/10* (2013.01); *C08L 39/04* (2013.01); *C08L 79/02* (2013.01); *B03D 1/01* (2013.01); *B03D 2201/002* (2013.01); *B03D 2201/06* (2013.01); *B03D 2203/02* (2013.01); *B03D 2203/025* (2013.01); *C02F 1/56* (2013.01); *C02F 2101/20* (2013.01); *C02F 2103/10* (2013.01)

(58) Field of Classification Search
CPC ...................................................... B03D 1/016
See application file for complete search history.

(56) References Cited

U.S. PATENT DOCUMENTS

| | | | | |
|---|---|---|---|---|
| 3,782,546 | A | | 1/1974 | Kirwin et al. |
| 3,862,028 | A | * | 1/1975 | Jones ....................... B03D 1/08 209/166 |
| 5,019,275 | A | * | 5/1991 | Good, Jr. .............. C08F 220/28 210/734 |
| 6,080,804 | A | * | 6/2000 | Davies ..................... B01D 1/14 523/340 |
| 2004/0159613 | A1 | * | 8/2004 | Bair ................... B01D 21/0018 210/726 |
| 2007/0000839 | A1 | | 1/2007 | Wright et al. |
| 2009/0301972 | A1 | | 12/2009 | Hines et al. |
| 2010/0331484 | A1 | | 12/2010 | Swift et al. |
| 2014/0110621 | A1 | * | 4/2014 | Kerns ....................... C22B 3/00 252/61 |
| 2015/0314305 | A1 | * | 11/2015 | Gustafsson .......... C08G 73/022 209/166 |

OTHER PUBLICATIONS

Turner, H. D. G., et al. "Iron are flotation in the presence of polyacrylamides." Mineral Processing and Extractive Metallurgy 116.2 (2007):81-84.
Liu, Guangyi, et al. "The role of cationic polyacrylamide in the reverse flotation of diasporic bauxite." Minerals Engineering 20.13 (2007): 1191-1199.

* cited by examiner

*Primary Examiner* — Peter Keyworth
(74) *Attorney, Agent, or Firm* — Robin L. Teskin; Baker, Donelson, Bearman, Caldwell & Berkowitz PC

(57) ABSTRACT

The present embodiments generally relate to a technology for improving Cu/Mo grade by the addition of cationic polymers as selective depressants for acid insoluble matters, e.g., silicates and/or clays, in the flotation circuit. Various types of cationic polymers are demonstrated to be effective depressants including polyamine, polyDADMAC, and cationic polyacrylamide. Also disclosed are processes for enriching a desired mineral from an ore comprising the desired mineral and gangue, wherein the process comprises carrying out a flotation process in the presence of one or more cationic polymer depressants.

18 Claims, No Drawings

CATIONIC POLYMER SELECTIVE DEPRESSANTS AND USE THEREOF IN MINERAL ORE PURIFICATION METHODS

RELATED APPLICATIONS

This application is a U.S. National Phase Application submitted under 35 U.S.C. 371 based on International Application No. PCT/US2017/049364 filed Aug. 30, 2017 (published as WO2018/045025 on Mar. 8, 2018), which claims the benefit of U.S. Provisional Patent Application 62/381,963 filed Aug. 31, 2016, each and all of which are hereby incorporated by reference in their entirety.

FIELD OF THE ART

The present disclosure generally relates to the use of selective depressants in mineral ore flotation processes.

BACKGROUND

As worldwide resources are being steadily consumed and as demand for mineral products expands due to increases in global population, the need to process complex ores more efficiently has become an area of active research. Several mineral commodities have been affected by this trend, in particular the production of copper and molybdenum. Copper and molybdenum production often encounter high levels of acid insoluble minerals (for example, silicate and/or clay minerals including amphibole, talc, quartz, feldspar, mica, clinocloro, serpentine, etc.) than their normal feed ore. Acid insoluble contamination can correlate with magnesium oxide or with iron content.

Copper and molybdenum face challenges associated with the insoluble matter that is contained in the final concentrate, as it lowers the grade of copper and molybdenum, and thereby significantly increases the energy cost in smelting. Additionally, a high content of insoluble matter may result in various metallurgical challenges, such as interference with flotation processes during purification processes and/or a decrease in copper and molybdenum recovery.

Generally, in order to obtain copper and molybdenum, lower grade ore must be processed. The processing of lower grade ore sources involves the removal of gangue, which generally comprises the unwanted minerals (such as silicates and carbonates) that are an intrinsic part of the ore rock itself. In these beneficiation processes, the gangue is separated using techniques like crushing, grinding, milling, gravity, or heavy media separation, screening, magnetic separation, and/or froth flotation to improve the concentration of the desired minerals and remove impurities.

One such beneficiation technique is froth flotation. In froth flotation the ore is ground to a size sufficiently small to liberate the desired mineral or minerals from the gangue. In general water may be added during the grinding process in order to generate a flotation feed that is in a slurry form. The slurry is then aerated, such as in a tank or column called a flotation cell. Froth flotation physically separates the ground particles based on differences in the ability of air bubbles to selectively adhere to specific mineral surfaces in the slurry. The particles with attached air bubbles are carried to the surface of the slurry, forming a froth that may be removed, while the particles that remain completely wetted stay in the solid/liquid phase.

An additional step that may be utilized in combination with the flotation process involves the removal of the ultra-fine particles by desliming. Ultra-fine particles are generally defined as those less than 5 to 10 microns in diameter. The desliming process may be accompanied by or followed by a flocculation step or some other type of settling step such as the use of a cyclone separating device. This step is typically followed by a flotation step wherein gangue materials are separated from the desired mineral or minerals in the presence of collectors and/or frothers.

The chemistry of the slurry can be modified to control or enhance how certain particles interact with the bubbles or alternatively, settle to the bottom. For example, "collectors," typically surfactants, can be added to the slurry to interact with the surface of particular particles causing an increase with the surface hydrophobicity of the particle and facilitate flotation. "Depressants" can be added to the slurry to selectively interact with the surface of certain particles to reduce the surface hydrophobicity and inhibit the flotation, i.e., facilitate the depression, of that type of particle.

In mineral flotation systems, it is common to depress or hold down the undesirable gangue materials while floating the desirable mineral or minerals. In differential or reverse flotation systems, it is common to depress or hold down the desired mineral or minerals while floating the undesirable gangue. That is, the normal flotation system is reversed with the silicate being enriched in the flotate and the desired mineral in the bottom fraction. Such reverse froth flotation systems are disclosed in U.S. Pat. No. 4,732,667.

Common depressants include materials derived from natural substances such as gums, dextrins and starches. See U.S. Pat. No. 3,292,780 to Frommer et al., and U.S. Pat. No. 3,371,778 to Iwasaki and U.S. Pat. No. 4,339,331.

Various synthetic depressants have been developed for use in the separation of gangue from desirable minerals, for example, as described in U.S. Pat. Nos. 4,360,425 and 4,289,613, 2,740,522, 3,929,629, and 4,808,301.

However, even with the use of depressants, some portion of the desired minerals may inadvertently be removed with the gangue. That portion of the valuable mineral or minerals that is inadvertently removed with the gangue may be permanently lost from the process. Improvement in the grade of a desired mineral in the recovered concentrate, ideally without adversely compromising the amount of the recovered mineral, e.g., copper and/or molybdenum, can result in significant economic benefits. Therefore, means for purifying metal ores such as copper and molybdenum that enhance the grade of the resultant product in the recovered mineral concentrate are desired.

BRIEF SUMMARY

The present embodiments generally pertain to a metal purification process wherein one or more metals may be purified from a composition that may comprise the metal and insoluble silicate and/or clay mineral contaminants, wherein said purification process includes at least one flotation step, and at least one of said flotation steps includes the addition of at least one cationic polymer which functions as a depressant for insoluble silicates and/or clay minerals associated therewith, e.g., amphibole, talc, quartz, feldspar, mica, clinocloro, serpentine, or a combination of any of the foregoing. In some instances the amount of insoluble silicates and/or clay minerals associated with the metal that is to be purified may correlate to MgO or Fe content.

Additionally, the present embodiments generally encompass a process for enriching a desired mineral from an ore that may comprise the desired mineral and gangue which may comprise insoluble silicate and/or clay mineral contaminants and/or oxide contaminants and in particular may comprise any or all of silicates; carbonates; sulfides; clay; oxides of aluminum, oxides of iron, silica (e.g. quartz), titanium, sulfur and alkaline earth metals; amphibole, talc, quartz, muscovite, sericite, biotite, chlorites, pyrite, feldspar, mica, clinocloro, and serpentines of iron, wherein the process comprises carrying out at least one flotation process in the presence of one or more of depressants, wherein at least one of said depressants may comprise a cationic polymer. In some embodiments, said metal which may be purified may be in the form of a metal sulfide. In some embodiments, said metal which may be purified may be selected from copper, molybdenum, gold, zinc, lead, nickel, platinum, palladium, rhodium, ruthenium, iridium, niobium and osmium and metal ores comprising any of the foregoing. In an exemplary embodiment, said metal which may be purified may comprise copper or a metal ore comprising copper. In another exemplary embodiment, said metal which may be purified may comprise molybdenum or a metal ore comprising molybdenum. In yet another exemplary embodiment, said metal which may be purified may comprise zinc or a metal ore comprising zinc. In still another exemplary embodiment, said metal which may be purified may comprise niobium or a metal ore comprising niobium.

Another exemplary embodiment generally relates to any metal purification process described herein wherein the amount (percent by weight) of insoluble contaminants in the impure metal containing composition or gangue may range from 1% to 70%. A further embodiment generally encompasses any process described herein wherein the mole percent of cationic monomers in the cationic polymer ranges from 1% to 100% with the proviso that the resultant cationic polymer has an overall positive (cationic) charge. In another embodiment, said mole percent of cationic monomers in the cationic polymer may range from 0.001-1%, 1-5%, 5-10%, 10-20%, 20-30%, 30-40%, 40-500%, 50-60%, 60-70%, 70-80%, 80-90%, or 90-100%. In yet another embodiment, said cationic polymer may predominantly or exclusively comprise cationic monomers. In another embodiment, said cationic polymer depressant may comprise cationic monomers and anionic and/or neutral monomers. In another embodiment, said polymer depressant may be amphoteric, i.e., comprising both cationic charge and anionic charge. In a further embodiment, said cationic polymer depressant may be water soluble. Another embodiment generally pertains to any process described herein wherein said cationic polymer depressant may comprise or may consist of an acrylamide-containing polymer. In a further embodiment, said cationic polymer depressant may comprise or may consist of polyacrylamide, copolymers of acrylamide, sulfonated polyacrylamide, cationic polyacrylamide, and partially hydrolyzed acrylamide. In yet another embodiment, said cationic polymer depressant may comprise or may consist of acrylamide or partially hydrolyzed acrylamide and one or more cationic monomers.

Another exemplary embodiment generally encompasses any of the processes described herein wherein said cationic polymer depressant may comprise or may consist of cationic monomers which may include by way of example dialkylaminoalkyl acrylates and methacrylates and their quaternary or acid salts, such as dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl acrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Furthermore, in another embodiment said cationic polymer depressant may comprise or may consist of acrylamide or partially hydrolyzed acrylamide and one or more cationic monomers. In another embodiment, said cationic polymer depressant may comprise acrylamide or partially hydrolyzed acrylamide and one or more cationic monomers. In a further embodiment, said cationic polymer depressant may comprise about 10% to about 60% cationic monomers by weight. In yet another embodiment, said cationic polymer depressant may comprise a cationic polyacrylamide. In yet another embodiment, said cationic polymer depressant may be a copolymer comprising one or more cationic monomers and acrylamide monomers. In a further embodiment, a pre-treatment agent for use with any of the process described herein may be a cationic polyacrylamide that may have a molecular weight (MW) in the range of 200,000-2,000,000 g/mol. In yet another embodiment, said cationic polymer depressant may comprise cationic polyacrylamide having an average molecular weight (MW) in the range of 400,000-2,000,000 g/mol, typically 400,000-1,900,000, more typically 500,000-1,900,000, preferably 1,000,000-1,900,000 g/mol, more preferably 1,200,000-1,900,000 g/mol.

In a further embodiment, said cationic polymer depressant may be a cationic polyacrylamide may be produced by copolymerizing acrylamide with a cationic monomer or methacrylamide with a cationic monomer, e.g., methacryloyloxyethyl-trimethyl ammonium chloride, acryloyloxyethyltrimethyl ammonium chloride (Q9), methacrylamidopropyltrimethyl ammonium chloride, acrylamidopropyltri methyl-ammonium chloride, diallyldimethylammonium chloride, dimethylaminoethyl acrylate, dimethylaminoethyl methacrylate, dimethylaminopropylacrylamide, dimethylaminopropylmethacrylamide, or a similar monomer. In another embodiment, said cationic polymer depressant may be a cationic polyacrylamide that may comprise a copolymer of acrylamide or methacrylamide with methacryloyloxyethyltrimethyl ammonium chloride optionally containing other monomers, as long as its net charge may be cationic and it may have an acrylamide/methacrylamide backbone. In yet another embodiment, said cationic polymer depressant may comprise an acrylamide or methacrylamide based polymer which optionally may be rendered cationic after polymerization by an aftertreatment such as Hofmann or Mannich reactions. In a further embodiment, said cationic polymer depressant may comprise homo- or co-polymers made up from at least one monomer belonging to the group of diallyldimethylammonium chloride (DADMAC) vinylpyridinium chloride, N-vinylimidazoline chloride, vinylbenzyltrimethyl ammonium chloride, acryloyl-oxyethyl-trimethylammoniumchloride, acryloyl-oxyethyl-benzyldimethyl-ammoniumchloride methacryloyl-oxyethyl-trimethyl-ammoniumchloride, methacryloyl-oxyethyl-benzyldimethyl-ammoniumchloride, acrylamidopropyltrimethyl-ammoniumchloride (TMAPAA), acrylamidopropyl-benzyl-dimethylammoniumchloride (BDMAPAA), methacryl-amidopropyl-trimethylammonium-chloride (TMAPMA), and methacrylamidopropyl-benzyldimethylammoniumchloride (BDMAPMA). Moreover, in another embodiment, said cationic polymer depressant may comprise a cationic coagulant polymer, e.g., polydiallyldimethylammonium chloride (polyDADMAC). In exemplary embodiments the molecular weight of said polyDADMAC may range from hundreds to thousands of grams per mole, or it may be as high as one million. In yet another embodiment, said cationic polymer depressant may be synthesized by using a controlled molecular weight cationic polyacrylamide polymerized within a coagulant matrix, e.g., comprising [3-(methacryloylamino)propyl] trimethylammonium chloride (MAP-TAC), polydiallyldimethylammonium chloride (poly-DADMAC), polyamine, polyyinylamine, dimethylaminoethylacrylate methyl chloride or any of their mixtures. In yet another embodiment, said cationic polymer depressant may be selected from a group comprising cationic polyacrylamide, polydiallyldimethylammonium chloride (poly-DADMAC), polyamine, cationic starch and chitosan, and further wherein said cationic polyacrylamide may be obtained by copolymerizing acrylamide with a cationic monomer or methacrylamide with a cationic monomer, wherein said cationic monomer may e.g., be selected from the group consisting methacryloyloxyethyltrimethyl ammonium chloride, acryloyloxyethyltrimethyl ammonium chloride, 3-(methacrylamido) propyltrimethyl ammonium chloride, 3-(acryloylamido) propyltrimethyl ammonium chloride, diallyldimethylammonium chloride, dimethylaminoethyl acrylate, dimethylaminoethyl methacrylate, dimethylaminopropylacrylamide, dimethylaminopropylmethacrylamide, and similar monomers. In a further embodiment, said cationic polymer depressant may be a copolymer of acrylamide or methacrylamide with (meth)acryloyloxyethyltrimethyl ammonium chloride, optionally containing other monomers, as long as its net charge is cationic and it comprises an acrylamide/methacrylamide backbone. In yet another embodiment, said cationic polymer depressant may include one or more cationic polymer flocculants, e.g., wherein said polymer flocculants may include: homopolymers of water soluble cationic vinyl monomers, and copolymers of a water soluble cationic vinyl monomer with a nonionic monomer such as acrylamide or methacrylamide; cationic polymers containing only one cationic vinyl monomer, cationic polymers containing more than one cationic vinyl monomer, optionally modified or derivatized after polymerization such as by the Mannich reaction, and further wherein said polymer may possess at least 5 mole percent of cationic vinyl monomer or functional group, or at least 10 weight percent of cationic vinyl monomer or functional group. In some embodiments, said vinyl monomers may include: dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate or methyl chloride, Mannich reaction modified polyacrylamides, diallylcyclohexylamine hydrochloride (DACHA HCl), diallyldimethylammonium chloride (DADMAC), methacrylamidopropyltrimethylammonium chloride (MAPTAC) and allyl amine (ALA).

In specific embodiments, said cationic polymer depressant may be selected from the following: a) a cationic polymer comprising repeating units of one or more amine monomers; b) a cationic polymer comprising repeating units of one or more diallyldimethylammonium chloride monomers (polyDADMAC); c) a cationic polymer comprising repeating units of one or more acrylamide monomers and one or more cationic monomers; d) a cationic polymer comprising repeating subunits of one or more cationic monomers; or e) a combination or mixture of any of the foregoing. Additionally, in another embodiment, said cationic polymer a) may comprise repeating units of one or more amine monomers such as epichlorohydrin, dimethylamine and ethylenediamine monomers. In another embodiment, said cationic polymer may comprise from 0.1 to 99.9 mole percent of each of the different monomers subunits. In a further embodiment, said cationic polymer may comprise a terpolymer comprising repeating subunits of epichlorohydrin and dimethylamine and ethylenediamine. In a further embodiment, the cationic polymer depressant a) may comprise a terpolymer comprising repeating subunits of epichlorohydrin and dimethylamine and ethylenediamine; and the cationic polymer depressant c) may comprise recurring units of one or more acrylamide monomers with one or more Q9 units. In exemplary embodiments, the cationic polymer may contain between 10% and 55% Q9. In some embodiments, the cationic polymer depressant may be in a dry form, or in liquid form, such as a dispersion, suspension, or a solution, or in an emulsion.

Yet another exemplary embodiment generally relates to a process for enriching a desired mineral from an ore comprising a desired mineral and gangue, wherein the process may comprise carrying out a flotation process in the presence of one or more of the cationic polymer depressants as described herein. In yet another embodiment, said desired mineral may comprise one or more of the following: a copper-containing mineral, a molybdenum-containing mineral, a gold-containing mineral, a platinum-containing mineral, a palladium-containing mineral, a rhodium-containing mineral, a ruthenium-containing mineral, an iridium-containing mineral, an osmium-containing mineral, a nickel-containing mineral, a lead-containing mineral, a niobium containing mineral, or a zinc-containing mineral. Furthermore, said gangue may comprise one or more of the following: silicates; carbonates; sulfides; clay; oxides of iron, oxides of aluminum, silica (e.g. quartz), titanium, sulfur and alkaline earth metals; amphibole, talc, quartz, muscovite, sericite, biotite, chlorites, pyrite, feldspar, mica, clinocloro, and serpentine. In another embodiment, said flotation process may be a direct cationic flotation process. In yet another embodiment, said one or more depressants may be added in the form of a composition that may comprise the depressant and a solvent, e.g., wherein said solvent may be water. In a further embodiment, said metal which is purified may be copper and the process may improve the grade of copper from copper ore such that the grade of the recovered copper may be at least about 28% or more, at least about 29% or more, at least about 30% or more, at least about 39% or more, at least about 39.5% or more, may be at least about 40% or more, 40.8% or more, at least about 41.7% or more, or at least about 42.4%.

In a further embodiment, said metal which is purified may be copper and the process may allow for the recovery of copper from copper ore such that the percentage of recovered copper may be at least about 88% or more, at least about 89% or more, at least about 90% or more, at least about 94% or more, at least about 94.8% or more, at least about 95.2% or more, at least about 96.8% or more, or at least about 97.1% or more. In yet another embodiment, said metal which is purified may be molybdenum and the process may improve the grade of molybdenum from copper ore such that the grade of the recovered molybdenum may be at least about 1% or more, at least about 1.05% or more, at least about 1.1% or more, at least about 1.2% or more, or at least about 1.3% or more. In yet another embodiment, said metal which is purified may be molybdenum and the process may allow for recovery of molybdenum from molybdenum-containing ore such that the percentage of recovered molybdenum may be at least about 95% or more, 96% or more, 97% or more, or about 97.6% or more. In another embodiment, said metal which is purified may be zinc and the process may improve the grade of zinc from the zinc containing ore such that the grade of the recovered zinc may be at least about 2% or more, about 3% or more, about 3.5% or more, about 4% or more, about 4.55% or more or about 4.80% or more. In a further embodiment, said metal which is purified may be copper or molybdenum and the rejected amount of insoluble matter may be about 59.1%, about 64.2%, or about 69.8%. In a further embodiment, said metal which is purified may be copper or molybdenum and the said depressants may be present at a concentration of about 10-1000 grams per ton of said ore. In a further embodiment, said metal which is purified may be niobium and the process potentially may allow for the recovery of niobium from niobium ore such that the percentage of recovered niobium is enhanced.

Another exemplary embodiment generally relates to a process that uses a cationic polymer as a depressant in a flotation process. In some embodiments, said cationic polymers may increase the yield of a desired mineral. In exemplary embodiments, said desired mineral may comprise one or more of the following: copper, molybdenum, gold, zinc, lead, nickel, platinum, palladium, rhodium, ruthenium, iridium, and osmium. In yet another exemplary embodiment, said cationic polymers may comprise: a) a cationic polymer comprising repeating units of one or more amine monomers; b) a cationic polymer comprising repeating units of one or more diallyldimethylammonium chloride monomers; c) a cationic polymer comprising repeating units of one or more acrylamide monomers and one or more cationic monomers; d) a cationic polymer comprising repeating units of one or more cationic monomers; or e) a combination or mixture of any of the foregoing. In another embodiment, cationic polymer a) may comprise a terpolymer comprising repeating subunits of epichlorohydrin and dimethylamine and ethylenediamine. In other embodiments, cationic polymer c) may comprise recurring units of one or more acrylamide monomers with one more Q9 monomer units. In exemplary embodiments, cationic polymer c) may comprise from about 10% Q9 units to about 55% Q9 units.

In a further embodiment, said purified metal may comprise copper and the process may improve the grade of copper from copper ore such that the grade of the recovered copper may be at least about 28% or more, at least about 29% or more, at least about 30% or more, at least about 39% or more, at least about 39.5% or more, is at least about 40% or more, 40.8% or more, at least about 41.7% or more, or at least about 42.4%. In another embodiment, said purified metal may comprise copper and the process may allow for the recovery of copper from copper ore such that the percentage of recovered copper may be at least about 88% or more, at least about 89% or more, at least about 90% or more, at least about 94% or more, at least about 94.8% or more, at least about 95.2% or more, at least about 96.8% or more, or at least about 97.1% or more. In yet another embodiment, said purified metal may comprise molybdenum and the process may improve the grade of molybdenum from copper ore such that the grade of the recovered molybdenum may be at least about 1% or more, at least about 1.05% or more, at least about 1.1% or more, at least about 1.2% or more, or at least about 1.3% or more. In a further embodiment, said purified metal may comprise molybdenum and the process may allow for the recovery of molybdenum from molybdenum-containing ore such that the percentage of recovered molybdenum may be at least about 97.6%. In yet another embodiment, said purified metal may comprise zinc and the process may improve the grade of zinc from the zinc-containing ore such that the grade of the recovered zinc may be at least about 2% or more, about 3% or more, about 3.5% or more, about 4% or more, about 4.55% or more or about 4.80% or more. In yet another embodiment, said purified metal may comprise niobium and the process potentially may improve the grade of niobium from the niobium-containing ore such that the grade of the recovered niobium is substantially enhanced. In a further embodiment, the rejected amount of insoluble matter may be about 59.1%, about 64.2%, or about 69.8%. In another embodiment, said depressants may be present at a concentration of about 10-1000 grams per ton of said ore.

DETAILED DESCRIPTION

Definitions

As used herein the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, "gangue" generally refers to the undesirable minerals in a material, for example an ore deposit, that may contain both undesirable and desired minerals. Such undesirable minerals may include silicates, carbonates, sulfides, clay, oxides of aluminum, oxides of iron, silica (e.g. quartz), titanium, arsenic, fluorine, sulfur and alkaline earth metals. In certain embodiments, the gangue may include, but is not limited to including, amphibole, talc, quartz, muscovite, sericite, biotite, chlorites, arsenic, fluorine, feldspar, mica, clinocloro, and serpentine. In some instances, said gangue may comprise pyrite and/or iron.

As used herein, the terms "desired minerals", "desirable minerals", or "minerals of value" generally refer to minerals that may have value, and in particular, may be extracted from ore that contains the desired mineral and gangue. Examples of desired minerals may include copper, molybdenum, gold, silver, lead, zinc, niobium, and nickel; "platinum group ore" metals, which generally comprise platinum, palladium, rhodium, ruthenium, iridium, and osmium; or any minerals that contain copper, molybdenum, niobium, gold, silver, lead, zinc, nickel, platinum, palladium, rhodium, ruthenium, iridium, or osmium. Said desired minerals may be collected as a "desirable mineral concentrate" that results from various flotation processes.

As used herein, "ore" generally refers to rocks and deposits from which the desired minerals can be extracted. Other sources of the desired minerals may be included in the definition of "ore" depending on the identity of the desired mineral. The ore may contain undesirable minerals or materials, also referred to herein as gangue.

As used herein, "copper ore" and/or "copper-molybdenum ore" are both understood to generally encompass rocks, minerals and other sources of copper and/or molybdenum from which metallic copper and/or molybdenum may be extracted. As used herein, "niobium ore or niobium mineral" is similarly understood to generally encompass rocks, minerals and other sources of niobium from which metallic niobium may be extracted. Copper ore may generally comprise copper and copper combined with other elements, and often may additionally comprise recoverable amounts of molybdenum and molybdenum combined with other elements. Sulfide ores, in which copper is bound to sulfur are additionally encompassed by the terms "copper ore" and "copper-molybdenum ore". Additional types of copper and/or copper-molybdenum ores may comprise, but are not limited to comprising, oxide ores (such as, but not limited to, delafossite, chrysocolla, azurite, dioptase, brochatite, tennorite, atacamite and malachite and mixtures thereof), carbonate ores, and mixed ores. An additional source of copper and/or molybdenum that is generally encompassed by the terms "copper ore" and "copper-molybdenum ore" comprises chalcopyrite ($CuFeS_2$), which is generally an abundant copper-bearing type of mineral. Pyrites, inclusive of chalcopyrites, may additionally comprise molybdenum in the form of molybdenite. Molybdenite, which is a source of molybdenum, usually occurs in lower concentrations along with other metal sulfide minerals, such as copper ore and copper-bearing rocks and minerals. Molybdenite and/or molybdenum may be recovered from any type of "copper ore" and "copper-molybdenum ore" inclusive of, but not limited to, those types of copper ore and copper-molybdenum ore described herein. In exemplary embodiments, the copper ore and copper-molybdenum ore may be contaminated with gangue materials inclusive of but not limited to those gangue materials described herein. In some instances, both copper ore and copper-molybdenum ore may contain other desired minerals including but not limited to those discussed herein that further may be extracted from said ore.

As used herein, a "collector" or "collecting agent" generally refers to an agent that facilitates the flotation of the associated gangue in preference to the flotation of the desired minerals. Typically, collectors may be reagents that are used to selectively adsorb onto the surfaces of particles. In various examples, the collector may form a monolayer on the particle surface that essentially makes a thin film of non-polar hydrophobic hydrocarbons. Collectors may be generally classed depending on their ionic charge: they can be nonionic, anionic, or cationic. The nonionic collectors may be simple hydrocarbon oils. Typical anionic and cationic collectors generally comprise a polar part that selectively attaches to the mineral surfaces, and a non-polar part that projects out into the solution and makes the surface hydrophobic. For example, common cationic collectors may include compounds featuring primary, secondary, and tertiary amine groups. Since the amine group has a positive charge, it may attach to negatively-charged particle surfaces. Collectors may either chemically bond to the mineral surface (chemisorption), or may be held on the surface by physical forces (physical adsorption). Examples of collectors may include, but are not limited to including, carboxylic acids, sulfates, sulfonates, xanthates, e.g., potassium amyl xanthate, potassium butyl xanthate, potassium propyl xanthate, potassium ethyl xanthate, potassium methyl xanthate, and dithiophosphates.

As used herein, a "pH adjuster" or "pH regulator" refers to an agent that may be used to change or control pH. The surface chemistry of most minerals is generally affected by the pH. For example, in general, minerals may typically develop a positive surface charge under acidic conditions and a negative charge under alkaline conditions. Since each mineral may change from negatively-charged to positively-charged at a particular pH value, it is possible to manipulate the attraction of collectors to their surfaces by pH adjustment. Exemplary pH adjusters may be acids, for example sulfuric acid, or alkalis, for example with lime (CaO or $Ca(OH)_2$) or ammonium hydroxide. Other useful pH adjusters may be sodium-based alkalis such as NaOH or $Na_2CO_3$, wherein the sodium cation generally may not have any significant effect on the particle surface chemistries.

As used herein, a "depressant" generally refers to a chemical that may reduce or inhibit the flotation of a material (e.g., minerals or gangue) to improve the selectivity of a flotation process. A depressant may selectively coat the surface of the material to be depressed and may prevent collector adsorption. In various embodiments, the depressant may comprise, but is not limited to comprising, any one or more polymers or one or more cationic polymers or one or more amphoteric polymers as discussed herein, or any combination thereof.

As used herein, "flocculant" refers to any substance that increases the cohesive forces between and/or among discrete fibers, layered silicates/insoluble matter, and precipitates in the feed solution. The flocculant generally assists in formation of product or removal of the product from the feed solution by aggregating the product into discrete domains in the feed solution. The aggregated product more quickly settles under gravity to the bottom of the feed solution than does the product in the absence of the flocculant.

As used herein, the terms "polymer," "polymers," "polymeric," and similar terms are used in their ordinary sense as understood by one skilled in the art, and thus may be used herein to refer to or describe a large molecule (or group of such molecules) that may contain recurring units. Polymers may be formed in various ways, including by polymerizing monomers and/or by chemically modifying one or more recurring units of a precursor polymer. Unless otherwise specified, a polymer may comprise a "homopolymer" comprising substantially identical recurring units formed by, e.g., polymerizing, a particular monomer. Unless otherwise specified, a polymer may also comprise a "copolymer" comprising two or more different recurring units formed by, e.g., copolymerizing, two or more different monomers, and/or by chemically modifying one or more recurring units of a precursor polymer. Unless otherwise specified, a polymer may also comprise a "terpolymer" comprising three or more different recurring units. Said terms may generally refer to polymers comprising, but not limited to comprising, cationic monomers or cationic polymers.

As used herein, the term "cationic monomer" generally refers to a monomer that possesses a positive charge. Representative cationic monomers may include but are not limited to including dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups may generally be $C_{1-8}$ alkyl.

A used herein, the term "cationic polymers" generally refers to a polymer that carries an overall positive charge. Said cationic polymers may comprise any combination of one or more cationic monomers exemplified by but not limited to those cationic monomers discussed herein. Said cationic polymers may comprise but are not limited to comprising cationic polymer samples comprising polyamine, polydiallyldimethylammonium chloride ("polyDADMAC"), or cationic polyacrylamide. Said cationic polymers may comprise but are not limited to comprising repeating units of one or more amine monomers; repeating units of one or more diallyldimethylammonium chloride monomers ("DADMAC"); and/or repeating units of one or more acrylamide monomers. Said cationic polymers may generally comprise homopolymers, copolymers, terpolymers, or any other form of polymer that is generally comprised of repeating units of one or more amine monomers; repeating units of one or more DADMAC monomers; or repeating units of one or more acrylamide monomers, which may further comprise one or more cationic monomers. Exemplary cationic polymers comprise but are not limited to terpolymers comprising repeating subunits that comprise epichlorohydrin, dimethylamine, and ethylenediamine monomers; polymers comprising repeating subunits of DADMAC (polyDADMAC); polymers comprising repeating subunits of acrylamide additionally comprising Q9 as a cationic charge. In the case of polyDADMAC, either the N-substituted piperdine or the N-substituted pyrrolidine structure may be used. In various embodiments, the cationic polymers may be in a dry form, or in liquid form, such as a dispersion, suspension, or a solution, or in an emulsion. In various embodiments, the cationic polymer may include one or more additional monomers. The one or more additional monomers may be any other suitable monomer, provided the depressant retains the desired functionality described herein. In some embodiments, the polymer depressant may be amphoteric, i.e., comprising both cationic charge and anionic charge. One or more cationic polymers, inclusive of but not limited to those discussed herein, may be used as selective depressants, for example as depressants in various flotation processes.

Said cationic polymers may also be homo- or co-polymers that may be made up from at least one monomer belonging to the group comprising but not limited to DADMAC, vinylpyridinium chloride, N-vinylimidazoline chloride, vinylbenzyltrimethylammonium chloride acryloyl-oxyethyl-trimethylammoniumchloride, acryloyloxyethyl-benzyldimethyl-ammoniumchloride, methacryloyloxyethyl-trimethylammoniumchloride, methacryloyl-oxyethyl-benzyldimethyl-ammoniumchloride, acrylamidopropyltrimethyl-ammoniumchloride (TMAPAA), acrylamidopropyl-benzyl-dimethylammoniumchloride (BDMAPAA), methacryl-amidopropyl-trimethylammonium-chloride (TMAPMA), and methacrylamidopropyl-benzyldimethylammoniumchloride (BDMAPMA).

Another polymer that may be used as a cationic polymer may be polyDADMAC, which generally comprises a linear homopolymer formed from a monomer that has a quaternary ammonium and two unsaturated —CH=CH2 functionalities. The monomer itself may be formed by reacting two equivalents of allyl chloride with dimethylamine. Free-radical polymerization of the DADMAC monomers may yield a structure in which the quaternary ammonium groups may be on rings that may be included in the backbone of the polymer chain. This composition generally relates to a condition wherein the polyDADMAC macromolecules may generally be quite stiff, having a long persistence length. Due to its persistence length, polyDADMAC may be expected to have a more extended conformation in solution. The molecular weight of DADMAC may typically be in the range of hundreds of thousands of grams per mole, and even up to a million for some products.

In various embodiments, said cationic polymers may be selected from a group comprising cationic polyacrylamide, polyDADMADC, polyamine, cationic starch and chitosan. The cationic polymer may be cationic polyacrylamide. Cationic polyacrylamide may be obtained by copolymerizing acrylamide with a cationic monomer or methacrylamide with a cationic monomer. The cationic monomer may be selected from the group consisting methacryloyloxyethyltrimethyl ammonium chloride, acryloyloxyethyltrimethyl ammonium chloride, 3-(methacrylamido) propyltrimethyl ammonium chloride, 3-(acryloylamido) propyltrimethyl ammonium chloride, diallyldimethyl ammonium chloride, dimethylaminoethyl acrylate, dimethylaminoethyl methacrylate, dimethylaminopropylacrylamide, dimethylaminopropylmethacrylamide, and similar monomers and additionally may be selected from but not limited to those cationic monomers discussed herein. In an embodiment, the cationic polyacrylamide may be a copolymer of acrylamide or methacrylamide with (meth)acryloyloxyethyltrimethyl ammonium chloride. Cationic polyacrylamide may also contain other monomers as long as the polymer retains the properties and/or functionalities described herein. An acrylamide or methacrylamide based polymer may also be treated after the polymerization to render it cationic, for example, by using Hofmann or Mannich reactions.

Said cationic polymers may also include one or more cationic polymer flocculants. Examples of polymer flocculants may include but are not limited to including homopolymers of water soluble cationic vinyl monomers, and copolymers of a water soluble cationic vinyl monomer with a nonionic monomer such as acrylamide or methacrylamide. The polymers may comprise only one cationic vinyl monomer, or may comprise more than one cationic vinyl monomer. Alternatively, certain polymers may be modified or derivatized after polymerization such as polyacrylamide by the Mannich reaction to produce a cationic vinyl polymer. The polymers may have been prepared from as little as 1 mole percent cationic monomer to 100 mole percent cationic monomer, or from a cationically modified functional group on a post polymerization modified polymer. Exemplary cationic polymers may have at least 5 mole percent of cationic vinyl monomer or functional group, or at least 10 weight percent of cationic vinyl monomer or functional group. Cationic vinyl monomers that may be useful in making the cationically charged vinyl addition copolymers and homopolymers may be well known to those skilled in the art. Vinyl monomers may include but are not limited to including: dimethylaminoethyl methacrylate (DMAEM), dimethylaminoethyl acrylate (DMAEA), diethylaminoethyl acrylate (DEAEA), diethylaminoethyl methacrylate (DE-AEM) or their quaternary ammonium forms made with dimethyl sulfate or methyl chloride, Mannich reaction modified polyacrylamides, diallylcyclohexylamine hydrochloride (DACHA HCl), DADMAC, methacrylamidopropyltrimethylammonium chloride (MAPTAC) and allyl amine (ALA).

In some embodiments, said cationic polymers may be synthesized by using a controlled molecular weight cationic polyacrylamide polymerized within a coagulant matrix. The coagulant matrix may have higher cationic charge than the polyacrylamide which is polymerized within it. The coagulant matrix may comprise [3-(methacryloylamino)propyl] trimethylammonium chloride (MAPTAC), polydiallyldimethylammonium chloride (poly-DADMAC), polyamine, polyyinylamine, dimethylaminoethylacrylate methyl chloride, or any of their mixtures.

As used herein, the term "starch" generally refers to a carbohydrate consisting of a large number of glucose units joined by glycosidic bonds. Starch polymers generally comprise two fractions, amylose and amylopectin, which vary with the source of starch. The amylose comprising a low molecular weight generally comprises one end group per 200-300 anhydroglucose units. Amylopectin may be of higher molecular weight and comprise more than 5,000 anhydroglucose units with one end group for every 20-30 glucose units. While amylose may be a linear polymer having a 1→4 carbon linkage, amylopectin may be a highly branched polymer with a 1→4 and a 1→6 carbon linkages at the branch points.

Selective Depressants

The exemplary embodiments generally relate to processes for improving the grade of desired minerals, e.g., copper, niobium and/or molybdenum, by the addition of cationic polymers as selective depressants for gangue and insoluble matters in the flotation circuit. Said cationic polymers, when used as selective depressants in flotation processes, e.g., cleaner flotation, depress the majority of insoluble matter and gangue such that said matter can be rejected to tails and the desired mineral grade may be significantly enhanced. Said cationic polymers may comprise any combination of one or more cationic monomers including but not limited to those cationic monomers discussed herein. Said cationic polymers generally encompass polymers that carry an overall or net positive charge.

Said cationic polymers may comprise but are not limited to comprising cationic polymer samples such as polyamine, polyDADMAC and cationic polyacrylamide. Said cationic polymers may further comprise but are not limited to comprising repeating units of one or more amine monomers; repeating units of one or more DADMAC monomers; or repeating units of one or more acrylamide monomers, which may further comprise one or more cationic monomers. Said cationic polymers may further comprise one or more polymers and may include e.g., homopolymers, copolymers, terpolymers, or any other form of polymer that generally comprises repeating units of one or more amine monomers; e.g., repeating units of one or more DADMAC; or repeating units of one or more acrylamide monomers, which may further comprise one or more cationic monomers. Exemplary cationic polymers include but are not limited to comprising terpolymers comprising repeating subunits that comprise epichlorohydrin, dimethylamine, and ethylenediamine monomers; polymers comprising repeating subunits of diallyldimethylammonium chloride (generally referred to as polydiallyldimethylammonium chloride and/or poly-DADMAC); polymers comprising repeating subunits of acrylamide and Q9. When using polyDADMAC as the cationic polymer depressant, either the N-substituted piperdine or the N-substituted pyrrolidine structure may be used.

In typical embodiments, the one or more cationic polymers will be water soluble. In some embodiments, the one or more cationic polymers may comprise an acrylamide-containing polymer. In some embodiments, the one or more cationic polymers may comprise polyacrylamide, copolymers of acrylamide, sulfonated polyacrylamide, cationic polyacrylamide, and partially hydrolyzed acrylamide.

In some embodiments, the one or more cationic polymers may comprise acrylamide or partially hydrolyzed acrylamide and one or more cationic monomers.

In some embodiments, the one or more polymers may comprise acrylamide or partially hydrolyzed acrylamide and one or more cationic monomers. In various embodiments, the one or more cationic polymers may comprise acrylamide or partially hydrolyzed acrylamide and one or more cationic monomers. In some embodiments, the one or more cationic polymers may comprise about 10% or more to about 55% or more cationic monomers by weight, about 10% or more to about 60% or more cationic monomers by weight, or about 5% or more to about 55% or more cationic monomers by weight, about 10% to about 60% cationic monomers by weight, about 10% to about 55% cationic monomers by weight, or about 5% or more to about 60% or more cationic monomers by weight. In some embodiments, the one or more polymers may comprise a cationic polyacrylamide. In some embodiments, the cationic polyacrylamide may comprise a polymer comprising a copolymer comprising one or more cationic monomers and acrylamide monomers. In some embodiments, the cationic polymer may be a cationic polyacrylamide having a molecular weight (MW) in the range of about 200,000-2,000,000 g/mol. In some embodiments, the cationic polymer may comprise cationic polyacrylamide that has an average molecular weight in the range of about 400,000-2,000,000 g/mol, typically about 400,000-1 900 000, or typically about 500,000-1 900 000, or preferably about 1,000,000-1,900,000 g/mol, or about 1,200,000-1,900,000 g/mol. In some embodiments the cationic polyacrylamide may be produced by copolymerizing acrylamide with a cationic monomer or methacrylamide with a cationic monomer. Said cationic monomer may e.g., be selected from the group consisting of but not limited to methacryloyloxyethyl-trimethylammonium chloride, acryloyloxyethyltrimethylammonium chloride, methacrylamidopropyltrimethylammonium chloride, acrylamidopropyltrimethyl-ammonium chloride, diallyldimethylammonium chloride, dimethylaminoethyl acrylate, dimethylaminoethyl methacrylate, dimethylaminopropylacrylamide, dimethylaminopropylmethacrylamide, or a similar cationic monomer inclusive of but not limited to those discussed herein. According to an embodiment, the cationic polyacrylamide may be a copolymer of acrylamide or methacrylamide with methacryloyloxyethyltrimethyl ammonium chloride. Cationic polyacrylamide may also contain other monomers, including neutral or anionic monomers, as long as its net charge may be cationic and it may have an acrylamide/methacrylamide backbone. Such acrylamide or methacrylamide based polymers may also be treated after polymerization to render them cationic, for example, by using Hofmann or Mannich reactions.

In various embodiments, the cationic polymer may include one or more additional monomers. The one or more additional monomers may be any other suitable monomer, provided the selective depressant retains the desired functionality described herein.

In various embodiments the depressant may include additional monomers up to about 3%, about 5%, about 10%, about 15%, about 20%, about 25%, or about 30% of the polymer, provided that the polymer retains its desired functionality, as described herein.

In exemplary embodiments, the one or more depressants are not substantially digestible or are not suitable for human consumption.

In exemplary embodiments, the one or more depressants may have any molecular weight so long as the depressants have the effect of selectively depressing the gangue in preference to the associated desired minerals. In exemplary embodiments, the molecular weight of the depressant that may be used during various flotation processes may be about 200,000 to about 1,000,000; about 250,000 to about 800,000; about 300,000 to about 600,000; about 400,000 to about 600,000, or about 400,000 to about 500,000 Daltons.

In some embodiments, the polymer may be linear. In other embodiments, the polymer structure may include branched polymers, star polymers, comb polymers, crosslinked polymers, or combinations thereof.

The subject cationic polymers may be made in accordance with any of a variety of polymerization methods. For example, suitable methods of addition polymerization may be employed such as free radical polymerization, controlled radical polymerization such as atom transfer radical polymerization, reversible addition-fragmentation chain transfer, nitroxide mediated polymerization, cationic polymerization, and/or ionic polymerization. In exemplary embodiments, the polymers may be made by radical or controlled radical polymerization methods. Suitable reaction media include but are not restricted to water solution, aqueous solution (comprising water and polarity changing water soluble organic compounds such as alcohols ethers, esters, ketones and or hydroxy ethers), emulsion, and microemulsion.

As shown herein the subject cationic polymer depressants are useful as selective depressants in direct flotation processes. In particular, these depressants are effective in selectively depressing the flotation of gangue as compared to desired minerals which are to be purified. In certain embodiments, the polymeric depressants may be used to enhance the separation of copper-containing and/or molybdenum-containing and/or niobium containing or other desired minerals from gangue by differentially depressing the flotation of the gangue relative to that of the copper-containing and/or molybdenum-containing and/or niobium containing or other desired minerals. As described earlier a challenge often observed during the separation of copper-containing and/or molybdenum-containing minerals from gangue is that the copper-containing and/or molybdenum-containing minerals and gangue both may float under certain processing conditions. Advantageously the subject cationic polymer depressants have been found to alter the flotation characteristics of the gangue relative to desired minerals, e.g., copper-containing and/or molybdenum-containing materials or any of the other minerals and mineral containing materials identified herein thereby significantly improving the metal separation/purification process.

Processes

According to various embodiments, a flotation process may use one or more of any of the polymer depressants described herein. Also, the subject cationic polymer depressants potentially may be used in conjunction with other types of depressants. In exemplary embodiments, the flotation process may include any known or later developed flotation techniques for separating or concentrating desirable minerals from ore and/or copper ore.

In general during a flotation process, a slurry (flotation pulp) comprising desired mineral particles, gangue, and water, is typically aerated, such as in a tank or column called a flotation cell. The air bubbles may attach to certain particles, carrying them to the surface of the slurry, and forming a froth, which may be removed. Generally speaking, the resulting froth will predominantly comprise those materials which are hydrophobic, and have an affinity for air bubbles. The particles in the slurry that remain wetted generally remain in the solid/liquid phase.

Exemplary flotation processes used in the inventive processes may take advantage of the differences in hydrophobicity between the desired minerals and the gangue to achieve separation of these materials. In various embodiments, one or more depressants may be added to the flotation system to selectively interact with the surface of the gangue, resulting in a reduced surface hydrophobicity that improves the depression of the gangue (i.e., reduces their propensity to float) during the flotation process. In various embodiments, one or more exemplary depressants may be added to the flotation system to selectively interact with the surface of gangue, resulting in a reduced surface hydrophobicity that improves selectivity in the flotation process.

In various embodiments, the flotation process may be a part of a mineral extraction process. For example, the mineral extraction process may include the steps of grinding crushed ore, classifying the ground ore in water, and treating the classified ore by froth flotation to concentrate the desired minerals. Some of these steps are described in more detail below.

In various embodiments, the flotation process may comprise inducing the gangue to sink to the bottom of the cell (as underflow) and the desirable mineral concentrate is recovered as the overflow (froth). In various embodiments, the flotation process comprises separating desired mineral concentrates, e.g., copper and/or molybdenum and/or niobium concentrates or other mineral concentrates, from gangue by flotation and recovery of the desired minerals and sinking the gangue as underflow.

In various embodiments, the inventive processes for enriching a desired mineral from an ore having the desired mineral and gangue will comprise carrying out a flotation process in the presence of one or more collecting agents and one or more selective depressants.

In exemplary embodiments, the desired mineral may be a copper-containing and/or molybdenum-containing and/or niobium-containing mineral.

In various embodiments, a process for enriching a desired mineral-containing mineral from an ore and/or copper ore having the desired mineral-containing material and gangue may comprise carrying out a flotation process in the presence of one or more collecting agents and one or more exemplary depressants described herein.

In exemplary embodiments, the flotation process may be a direct flotation process, for example a cationic or anionic flotation process.

In various embodiments, the flotation process may be a reverse or inverted flotation process, for example a reverse cationic or reverse anionic flotation process. In such processes, the flotation of the desired mineral may be selectively depressed when compared to the flotation of the gangue so as to facilitate separation and recovery of the desired mineral.

In various embodiments, the one or more depressants may be added in the form of a composition comprising the depressant and a solvent.

In various embodiments, the one or more depressants may be added at any stage of the process prior to the flotation step.

Typically, the amount of depressant that is used in the flotation process will be an amount at least sufficient to selectively depress the flotation of the gangue to a necessary or desired extent. The amount of depressant added may depend, at least in part, on a number of factors such as the particular ore to be processed, desired mineral and gangue to be separated, the composition of the one or more depressants, the particle size of the gangue and desired mineral, and other conditions of the flotation process. In various embodiments, the amount of depressant used in the flotation process may be about 0.01 to about 5.0 kg, or from about 0.01 to about 3 kg, or from about 0.01 to about 1.0 kg of depressant per metric ton of ore treated in the flotation process.

In some embodiments, the amount of depression may be quantified. For example, a percent depression may be calculated by measuring the weight percent of the particular mineral or gangue floated in the absence of any depressant and measuring the weight percent of the same mineral or gangue floated in the presence of a depressant. The latter value is subtracted from the former, the difference is divided by the weight percent floated without any depressant; and this value is multiplied by 100 to obtain the percent of depression. In some embodiments, the percent of depression may be any amount that will provide a necessary or desired amount of separation to enable separation of the desirable minerals from gangue. In exemplary embodiments, use of an exemplary depressant causes the flotation of gangue to be depressed by at least about 1%, about 3% or more, about 4% or more, about 5% or more, about 6% or more, about 7% or more, about 8% or more, about 9% or more, about 10% or more, or about 12% or more as compared to the same flotation process performed without a depressant. In other exemplary embodiments, use of an exemplary depressant causes the flotation of gangue to be depressed such that the percentage of insoluble matter depressed is between about 50% to about 95%.

In other embodiments, the amount of depression may be quantified according to the percent improvement of the mineral grade, i.e., the change in percent by weight of the valuable mineral in the concentrated material compared to the material before the froth flotation process. In various embodiments, use of depressants may cause valuable metal grade to increase by at least about 0.5% or more, about 1.0% or more, about 1.5% or more, about 2.0% or more, about 3.0% or more, about 5.0% or more, or about 10% or more, or about 15% or more compared to the same process run without the depressant. Even relatively modest amounts of improvement to the recovered metal grade may represent significant increases in production and profitability of the method over time.

In some embodiments, one or more additional agents and/or modifiers may be added to the ore that is dispersed in water (flotation pulp). Examples of such agents and modifiers may include but are not limited to frothers, activators, collecting agents, depressants, acidic or basic addition agents, or any other agent known in the art.

According to various embodiments, the flotation process may use an exemplary depressant or depressants in combination with one or more additional depressants. Examples of additional depressants may include but are not limited to including: starch; starch activated by treatment with alkali; cellulose esters, such as carboxymethylcellulose and sulphomethylcellulose; cellulose ethers, such as methyl cellulose, hydroxyethylcellulose and ethyl hydroxyethylcellulose; hydrophilic gums, such as gum arabic, gum karaya, gum tragacanth and gum ghatti, alginates; starch derivatives, such as carboxymethyl starch and phosphate starch; and combinations thereof. In certain embodiments, the one or more depressants may not be used in a flotation process with starch.

According to various embodiments, the flotation process may use the depressants in combination with one or more collectors or collecting agents. In certain embodiments, the one or more exemplary depressants may be added before or with the addition of collecting agents. In certain embodiments, in one step of the flotation process, one or more collecting agents may be added, for example after the addition of the one or more depressants and any other process agents. In various embodiments, a collecting agent or collector may be added to the flotation pulp. Generally, collecting agents may form a hydrophobic layer on a given particle surface in the flotation pulp, which facilitates attachment of the hydrophobic particles to air bubbles and recovery of such particles in the froth product. Any collecting agent which is suitable for particular purification process may be used. The choice of collector may depend, at least in part, on the particular ore to be processed and on the type of gangue to be removed. Suitable collecting agents are well known to those skilled in the art. In various embodiments, the collector may be a cationic collector that is an organic molecule having a positive charge when in an aqueous environment. In other embodiments, the cationic collectors may have a nitrogen group with unpaired electrons present. Exemplary cationic collectors which may be used in combination with depressants may include: fatty amines, ether amines, amine condensates, alkyloxyalkaneamines, alkoxylated quaternary ammonium compounds and their salts. The fatty amines may be mono-functional or difunctional and the amine functionality may be primary, secondary or tertiary. Similarly, the ether amines may be primary amines or may be difunctional. Ether amines for use as collectors according to the presently disclosed embodiments may not be particularly limited and include $C_{5-15}$ aryl or alkyl oxypropyl amines which may be branched or linear, and $C_{5-15}$ branched or linear oxypropyl diaminopropane.

In some embodiments, the collecting agents may be compounds comprising anionic groups, cationic groups or non-ionic groups. In certain embodiments, the collecting agents may be surfactants, i.e. substances containing hydrophilic and hydrophobic groups linked together. Certain characteristics of the collecting agent may be selected to provide a selectivity and performance, including solubility, critical micelle concentration and length of carbonic chain.

Collecting agents may also include compounds containing oxygen and nitrogen, for example compounds with amine groups. In various embodiments, the collecting agents may be selected from the group consisting of: ether amines, for example primary ether monoamines, and primary ether polyamine; aliphatic $C_8$-$C_{20}$ amines for example aliphatic amines derived from various petroleum, animal and vegetable oils, octyl amine, decyl amine, dodecyl amine, tetradecyl amine, hexadecyl amine, octadecyl amine, octadecenyl amine and octadecadienyl amine; quaternary amines for example dodecyl trimethyl ammonium chloride, coco trimethyl ammonium chloride, and tallow trimethyl ammonium sulfate; diamines or mixed amines for example tallow amine, hydrogenated tallow amine, coconut oil or cocoamine, soybean oil or soya-amine, tall oil amine, rosin amine, tallow diamine, coco diamine, soya diamine or tall oil diamines and the like, and quaternary ammonium compounds derived from these amines; amido amines and imidazolines such as those derived from the reaction of an amine and a fatty acid; and combinations or mixtures thereof. In an embodiment, the collecting agent may be an ether amine or mixture of ether amines.

Exemplary collecting agents include xanthates, e.g., potassium amyl xanthate, potassium butyl xanthate, potassium propyl xanthate, potassium ethyl xanthate, potassium methyl xanthate, and dithiophosphates. In some embodiments, the collecting agents may be blended with a non-ionic collector, e.g., kerosene or pine oil.

Collecting agents may be partially or wholly neutralized by a mineral or organic acid such as hydrochloric acid or acetic acid. Such neutralization facilitates dispersibility in water. Alternatively, the amine may be used as a free base amine by dissolving it in a larger volume of a suitable organic solvent such as kerosene, pine oil, alcohol, and the like before use. In some instances these solvents may elicit undesirable effects on flotation such as reducing flotation selectivity or producing uncontrollable frothing. While collecting agents may differ substantially in structure, they are functionally similar, i.e., they ionize in solution yielding a positively charged organic ion.

The quantity of collecting agent used in the flotation process may vary. For example, the amount of collecting agent may depend, at least in part, upon the gangue content of the ore being processed.

In some embodiments, one type of collecting agent may be used in the process. In other embodiments, two or more collecting agents may be used in the process.

In various embodiments, one or more frothing agents may be used in the process. Exemplary frothing agents may be heteropolar organic compounds which reduce surface tension by being absorbed at air-water interfaces and thus facilitate formation of bubbles and froth. Examples of frothing agents may include but are not limited to including: methylisobutyl carbinol; alcohols having 6-12 carbon atoms which optionally are alkoxylated with ethylene oxide and/or propylene oxide; pine oil; cresylic acid; various alcohols and soaps. In various embodiments, about 0.001 to 0.2 lb. of frothing agent per ton of ore may be provided.

In some embodiments, the flotation process may result in a desired mineral-enriched floate (froth) and a bottom fraction containing the gangue (tailings, underflow). In some embodiments the floate or froth may contain copper and/or molybdenum and/or any desired mineral. In exemplary embodiments, the bottom fraction may contain the gangue.

In some embodiments, the flotation process may include one or more steps prior to the flotation step to prepare the ore for flotation. For example, a process may include the step of grinding the ore, together with water, to a desired particle size, for example a particle size between about 5 and about 200 μm. Optionally, one or more conditioning agents such as sodium hydroxide and/or sodium silicate may be added to the grinding mill prior to grinding the crude ore. In some embodiments a sufficient amount of water is added to the grinding mill to provide a slurry containing about 50% solids to about 70% solids.

In various processes, the ground ore may be deslimed. For example, the ground ore may be suspended in water, and fine material maybe deslimed, by filtration, settling, siphoning or centrifuging. In various embodiments, the desliming step may be repeated one or more times.

In various processes, an ore-water slurry may be prepared from the ground ore or the deslimed ore, and one or more depressants according to the embodiments may be added to the slurry. In various embodiments, the one or more depressants may be added in an amount of about 10 g to about 1000 g per ton of ore. In various embodiments, the ore-water slurry may be transferred to a flotation cell and the one or more depressants are added to the ore water slurry in the flotation cell.

In various embodiments, a base or alkali pH adjuster may be added to the slurry to adjust the pH of the slurry. For example, a pH adjuster may be added to the slurry to produce a pH in the range of about 7 to about 12, or about 9 to about 12, or about 10 to about 12. In certain embodiments, the pH is adjusted to about 10.5. In certain embodiments, the pH is adjusted to about 11.5. In various embodiments, the pH of the slurry in the flotation cell may be maintained at between about 7 and about 12 for optimum desirable mineral recoveries.

In various embodiments, the flotation process may include a step involving conditioning or agitation of the slurry. For example, once all of the processing agents have been added to the slurry, the mixture may be further conditioned or agitated for a period of time before the froth flotation may be carried out.

In various embodiments, the flotation process may be performed in a plurality of flotation processing steps. For example, the flotation process may be performed in flotation units containing a plurality of communicating cells in series, with the first cell(s) being generally used for the rougher flotation, and subsequent cell(s) generally being used for the cleaner flotation. In various embodiments, each flotation cell may be any flotation equipment, including, for example, the Denver laboratory flotation machine and/or the Wemco Fagergren laboratory flotation machine, in which the slurry mixture may be agitated and air may be injected near the bottom of the cell as desired.

In various embodiments, before flotation treatment the ore-water slurry may comprise about 15% to about 40% by weight solids. In various embodiments, the duration of the flotation process may depend upon the desired result. In various embodiments, the time of flotation treatment may be from about 1 to 10 minutes for each circuit. The time of the flotation process may depend at least in part upon the gangue content, the grain size of the ore being treated and the number of flotation cells involved.

According to some embodiments, the flotation process may include a rougher flotation treatment, in which the gangue may be selectively separated from the ore and removed with the underflow. The desired mineral concentrate from the flotation treatment is removed with the flotation froth and isolated as the rougher concentrate. In exemplary embodiments, the concentrate of the desirable mineral in the rougher concentrate is found to contain a sufficiently low quantity of gangue to be suitable for almost any desired use.

In some embodiments, the flotation froth, the rougher concentrate, or both may be further processed. For example, in various embodiments, the overflow or the rougher concentrate from the rougher flotation may be advanced to a first cleaner flotation cell where a second flotation treatment may be performed. The underflow from this first cleaning flotation cell may be a mineral concentrate identified as the first cleaner middlings which generally will contain more gangue than the rougher concentrate but significantly less gangue than the original crude ore. The overflow from the first cleaning cell may be advanced to a second cleaning flotation cell where the flotation procedure may be repeated and another mineral concentrate is obtained which is identified as the second cleaner middlings. In exemplary embodiments, the cleaning may be repeated one or more times. Any or all of the cleaner middlings may be combined with a rougher concentrate to provide an upgraded mineral ore concentrate. The extent to which the rougher concentrate may be combined with the various middling fractions will depend upon the desired mineral content of the final product derived from the procedure. As an alternative embodiment, the cleaner middlings may be returned and recycled through the rougher flotation cell to further upgrade these cleaner middlings.

The depressants, compositions and processes of the various embodiments may be used to provide higher selectivity and desired mineral recoveries as compared to other depressants when used in flotation processes. In various embodiments, the desired mineral concentrate that is obtained by the various processes meets the desired specifications for uses of desired minerals, e.g., copper and/or molybdenum. In various embodiments, the depressants, compositions and processes may be used to maximize the desired mineral, e.g., copper and/or molybdenum, recovery to increase production of metallic charge per unit ore fed, which may provide increases in production and profitability.

In various embodiments, the depressants, compositions and processes described herein may be used to improve the desired mineral grade, e.g., the grade of copper, such that the grade of the recovered desired mineral may be at least about 25% or more, about 28% or more, about 30% or more, about 35% or more, about 36% or more, about 37% or more, about 38% or more, about 39% or more, about 40% or more, about 41% or more, about 42% or more, or about 45% or more. In various embodiments, the depressants, compositions and processes described herein may be used to improve the desired mineral grade, e.g., the grade of molybdenum, such that the grade of the recovered desired mineral may be at least about 1% or more, about 1.1% or more, about 1.2% or more, about 1.3% or more, or about 1.4%. In various embodiments, the depressants, compositions and processes described herein may be used to improve the desired mineral grade, e.g., the grade of zinc, such that the grade of the recovered desired mineral may be at least about 2% or more, about 3% or more, about 3.5% or more, about 4% or more, or about 4.5% or more. In various embodiments, the depressants, compositions and processes described herein may be used to improve the grade of the desired mineral, e.g., copper, from ore and/or copper ore such that the grade of the recovered desired mineral, e.g., copper, may be in the range of about 35% to about 45%, about 36% to about 45%, about 37% to about 45%, about 38% to about 45%, about 39% to about 45%, about 40% to about 45%, or about 41% to about 45%. In various embodiments, the depressants, compositions and processes described herein may be used to improve the grade of the desired mineral, e.g., molybdenum, from ore and/or copper ore such that the grade of the recovered desired mineral, e.g., molybdenum, may be in the range of about 1%, about 1% to about 2%, about 1.1% to about 2%, about 1.2% to about 2%, about 1.3% to about 2%, about 1.4% to about 2%, or about 1.5% to about 2%. In various embodiments, the depressants, compositions and processes described herein may be used to improve the grade of the desired mineral, e.g., zinc, from ore and/or copper ore such that the grade of the recovered desired mineral, e.g., zinc, may be in the range of about 3%, about 3% to about 5%, about 4% to about 5%, about 4.5% to about 5%, or about 4.8% to about 5%. In various embodiments, the depressants, compositions and processes described herein may be used to improve the desired mineral grade, e.g., the grade of niobium, such that the grade of the recovered desired niobium containing mineral is enhanced.

In various embodiments, the depressants, compositions and processes described herein may be used to improve the grade of desired mineral, e.g., copper and/or molybdenum and/or zinc, from ore and/or copper ore by at least about 0.1% or more, about 0.2% or more, about 0.3% or more, about 0.4% or more, about 0.5% or more, about 1% or more, about 2% or more, about 2.5% or more, about 3% or more, about 3.5% or more, about 4% or more, about 4.5% or more, about 5% or more, about 6% or more, about 7% or more, about 8% or more, about 9% or more, about 10% or more, about 11% or more, about 12% or more, or about 15% or more. For example, the depressants, compositions and processes described herein may be used to improve the grade of the desired mineral, e.g., copper, from ore and/or copper ore with an initial desired mineral, e.g., copper, grade of about 30% to a grade of at least about 35% or more, at least about 36% or more, at least about 37% or more, at least about 38% or more, at least about 39% or more, at least about 40% or more, at least about 41% or more, at least about 42% or more, at least about 43% or more, at least about 44% or more, or at least about 45% or more. For example, the depressants, compositions and processes described herein may be used to improve the grade of the desired mineral, e.g., molybdenum, from ore and/or copper ore with an initial desired mineral, e.g., molybdenum, grade of about 0.95% to a grade of at least about 1% or more, at least about 1.1% or more, at least about 1.2% or more, at least about 1.3% or more, at least about 1.4% or more, or at least about 1.5% or more. For example, the depressants, compositions and processes described herein may be used to improve the grade of the desired mineral, e.g., zinc, from ore and/or copper ore with an initial desired mineral, e.g., zinc, grade of about 3.8% to a grade of at least about 4% or more, at least about 4.1% or more, at least about 4.2% or more, at least about 4.3% or more, at least about 4.4% or more, at least about 4.5% or more, at least about 4.6% or more, at least about 4.7% or more, at least about 4.8% or more, or about least about 4.9% or more. In various embodiments, the depressants, compositions and processes described herein may be used to improve the grade of the desired mineral, e.g., copper and/or molybdenum and/or zinc, from ore and/or copper ore by about 0.5% to about 12%, about 1% to about 12%, about 1.5% to about 12%, about 2% to about 12%, about 3% to about 12%, about 4.0% to about 12%, about 4.5% to about 12%, or about 4.8% to about 12%.

In exemplary embodiments, the depressants, compositions and processes described herein may be used to improve the grade of the desired mineral oxide, e.g., copper and/or molybdenum oxide, from ore and/or copper ore such that the grade of the recovered desired mineral, e.g., copper and/or molybdenum oxide, may be at least about 20% to about 50%. In various embodiments, the depressants, compositions and processes described herein may be used to improve the grade of desired mineral oxide, e.g., copper and/or molybdenum oxide, from ore and/or copper ore such that the grade of the recovered desired mineral oxide, e.g., copper and/or molybdenum oxide, may be in the range of about 20% to about 50%.

In various embodiments, the depressants, compositions and processes described herein may be used to allow for the recovery of the desired mineral, e.g., copper, from ore and/or copper ore, to be at least about 30% or more, about 35% or more, about 40% or more, about 41% or more, about 42% or more, about 43%, about 45%, about 50% or more, about 60% or more, about 70% or more, about 80% or more, or about 90% or more. In various embodiments, the depressants, compositions and processes described herein may be used to allow for the recovery of the desired mineral, e.g., molybdenum, from ore and/or copper ore, to be at least about 0.05% or more, about 0.1% or more, about 0.2% or more, about 0.3% or more, about 0.4% or more, about 0.5% or more, about 1% or more, about 5% or more, about 10% or more, about 20% or more, about 30% or more, about 40% or more, about 50% or more, about 60% or more, about 70% or more, about 80% or more, or about 90% or more. In various embodiments, the depressants, compositions and processes described herein may be used to allow for the recovery of the desired mineral, e.g., zinc, from ore and/or copper ore, to be at least about 0.05% or more, about 0.1% or more, about 0.2% or more, about 0.3% or more, about 0.4% or more, about 0.5% or more, about 1% or more, about 5% or more, about 10% or more, about 20% or more, about 30% or more, about 40% or more, about 50% or more, about 60% or more, about 70% or more, about 80% or more, or about 90% or more. In various embodiments, the depressants, compositions and processes described herein may be used to allow for the recovery of the desired mineral, e.g., copper, from ore and/or copper ore, to be in the range of about 30% to about 95%, about 35% to about 95%, about 40% to about 95%, or about 45% to about 95%. In various embodiments, the depressants, compositions and processes described herein may be used to allow for the recovery of the desired mineral, e.g., molybdenum, from ore and/or copper ore, to be in the range of about 1% to about 95%, about 1.1% to about 95%, about 1.2% to about 95%, or about 1.3% to about 95%. In various embodiments, the depressants, compositions and processes described herein may be used to allow for the recovery of the desired mineral, e.g., zinc, from ore and/or copper ore, to be in the range of about 3% to about 95%, about 4% to about 95%, about 4.5% to about 95%, or about 4.8% to about 95%.

In various embodiments, the depressants, compositions and processes may be used to reduce the amount of insoluble matter, e.g., gangue, in the desired mineral ore, e.g., copper ore, to less than about 20%, about 15%, about 10%, about 9%, about 8%, about 7%, about 6%, about 5%, about 4%, about 3%, or about 2%.

The following examples are presented for illustrative purposes only, and are not intended to be limiting.

EXAMPLES

General Protocol for Cleaner Flotation Tests

Cleaner flotation tests described herein were generally performed with a copper/molybdenum feed according to the following procedure:

The sample was pre-mixed well in a bucket with an overhead mixer and then representative samples were split from the bucket.

Using a calibrated pH meter, a make-up water (to keep the level of the recipient of the flotation cell constant) was prepared by adjusting its pH (for example to pH 10.5 or to pH 11.5 with NaOH 5% or acetic acid 10%/o) to a desired value.

The collector solution of xanthate, for example potassium amyl xanthate (concentration is, for example, 1 wt %), was prepared as well as the depressant and frother solution (concentration is, for example, 1 wt %). Preparation of the depressant solution had to take into account its moisture and organic content.

The flotation cell (2 L) was weighed and the required amount of pulp for flotation was added as follows: a feed was added, up to its half, completing the other half with the required quantities of collector and depressant solutions and with "water" (liquid) filtered from the sample of the feed received. (Note: the capacity of the flotation cell was measured up to the height of the blades.) The addition of these materials was made as follows:

1) The "water" volume needed for sample homogenization was added.

2) The extractor was downloaded up to the limit, switching on the rotation (950 rpm). The initial pH was measured and recorded.

3) The mass of depressant solution was added in and conditioned and/or agitated for a period of time, for example 1 minute, while monitoring the pH. If the pH stabilized at a desired value (for example between about pH 6 to about 11.5), no adjustment was needed. Otherwise, pH modifiers (for example 5% NaOH and/or acetic acid solution 10%) were added as necessary to adjust the pH to the desired value.

In some cases, after the conditioning and/or agitation and if necessary, pH adjustment, the mass of collector solution was added to the recipient vessel and the remaining volume of the tank was completed with remaining calculated "water" from the sample, for a given feed solids percentage. This mixture was conditioned or agitated for a period of time, for example 1 minute. Collection trays were weighed and their weighs recorded. In other cases, no collector was added in the cleaner stage. Instead, the residual collector from the rougher stage was sufficient for conducting the flotation process.

With the flotation cell and the collection trays put together, maximum aeration and collecting shovels were switched on, starting to count the timing of flotation (chosen according to each test). The level of recipient was kept constant by the use of makeup water, already prepared previously with a desired pH, for example a pH of 10.

At the end of the test, the flotation cell was cleaned taking the necessary care for no contamination of the materials floated and sunk.

The floated (concentrate containing desired minerals) and sunk (gangue) materials were collected in the weighed trays during the time chosen for collection. The samples were subsequently dried at 105° C. until constant weight was achieved.

The trays containing the float and sunk materials were weighed and recorded. A quantity of each material was sent for analysis of copper, molybdenum, and other soluble matter as well as insoluble matter contents.

Example 1: Cleaner Flotation Test with Cu/Mo Feed and Exemplary Depressants Comprising A, B, and C In this example, cleaner flotation tests were conducted on a laboratory scale and the objective of these tests was to separate the desired minerals (copper and molybdenum) from gangue. The general protocol for cleaner flotation tests as described above was used for these experiments. The depressants used for these experiments were A, B, and C, descriptions of which are provided in Table 1 below. A

TABLE 1

EXEMPLARY CATIONIC POLYMER DEPRESSANTS AND CHEMICAL COMPOSITION

| EXEMPLARY DEPRESSANT | CHEMICAL COMPOSITION |
|---|---|
| A | Terpolymer comprising epichlorohydrin plus dimethylamine plus ethylenediamine |
| B | PolyDADMAC |
| C | Polyacrylamide with 10% Q9 |
| D | Polyacrylamide with 55% Q9 |

TABLE 2

FLOTATION RESULTS OF EXEMPLARY DEPRESSANTS ON THE Cu/Mo DIRECT FLOTATION IN THE CLEANER STAGE

| Parameters | Cu (%) | Mo (%) | Insoluble (%) | Mass Recovery (%) | Cu in feed (%) | Mo in feed (%) | Insoluble in feed (%) | Cu Recovery (%) | Mo Recovery (%) | Insoluble Rejected (%) |
|---|---|---|---|---|---|---|---|---|---|---|
| Cleaner Feed | 30.94 | 0.99 | 28.2 | | | | | | | |
| B-CO | 40.8 | 1.3 | 13.7 | 73.5 | 30.90 | 0.98 | 28.14 | 97.1% | 97.6% | |
| B-RJ | 3.43 | 0.09 | 68.2 | | | | | | | 64.2% |
| A-CO | 41.7 | | 12.5 | 70 | 30.16 | | 28.97 | 96.8% | | |
| A-RJ | 3.22 | | 67.4 | | | | | | | 69.8% |
| C-CO | 42.4 | | 11.8 | 70.9 | 31.57 | | 27.75 | 95.2% | | |
| C-RJ | 5.19 | | 66.6 | | | | | | | 69.8% | copper/molybdenum feed that contained on average 30.85% copper, 0.985% molybdenum, and 28.31% insoluble matter was used, which was derived from an earlier flotation stage in which a highly insoluble ore from a copper and molybdenum ore was used. Said insoluble ore primarily contained insoluble matter in the form of amphibole, talc, quartz, and feldspar.

A Denver flotation cell of 2 liter volume was used for the tests described in the present example, wherein each A, B, and C were tested individually using the above described starting conditions. Each depressant was diluted to a 0.5% solution and added into a cell. For all tests of each depressant, the depressant dosage was set to 50 grams depressant per ton of ore. The flotation feed sample with 18% solids was conditioned at pH 10 for 1 minute. Following said conditioning, air was introduced to the flotation cell at a rate of 2 L/min. Next, the froth from each cell was collected for 4 minutes. Finally, the concentrate sample and the tail sample were weighed and then chemically analyzed in order to determine their properties and contents.

Table 1 below presents the results of the cleaner flotation tests that were performed using each of the depressants A, B, and C. The results demonstrated that by using a 50 g/ton dose of depressant, the copper grade in the concentrate was improved from 30.9% to around 41%, while the copper recovery was around about 95%-97%. Additionally, the results demonstrated that by using said depressants in the cleaner flotation process, about 60%-70% of the insoluble matter was rejected, and that the copper concentrate was significantly purified as compared to conditions wherein the depressants were not used. Overall, the results of the cleaner flotation tests described in the present example demonstrated that the three depressants, each of which are types of cationic polymers, were found to be effective for depressing insoluble matters and improving the separation efficiency of copper/molybdenum flotation.

Example 2: Cleaner Flotation Test with Cu/Mo Feed and Exemplary Depressants Comprising A and B In this example, cleaner flotation tests were conducted on a laboratory scale and the objective of these tests was to separate the desired mineral (copper) from gangue. The general protocol for cleaner flotation tests as described above was used for these experiments. The depressants used for this experiment were A and B. A copper/molybdenum feed that comprised the rougher concentrate was used, which was derived from an earlier flotation stage in which a highly insoluble ore from a copper and molybdenum ore mined in South America was used. Said insoluble ore primarily contained insoluble matter in the form of amphibole, talc, quartz, and feldspar.

A Denver flotation cell of 2 liter volume was used for the tests described in the present example, wherein each A and B were tested individually using the above described starting conditions. Each depressant was diluted to a 0.5% solution and added into a cell. For all tests of each depressant, the depressant dosage was set to 400 grams depressant per ton of ore. A collector, in the form of potassium amyl xanthate, and a frother were added to the slurry. The collector dosage was 3 g per ton of ore and the frother dosage was 20 g per ton of ore. Following addition of the collector, depressant, and frother, the flotation feed sample was conditioned at pH 11.5 for 1 minute. Following said conditioning, air was introduced to the flotation cell at a rate of 3 L/min. Next, the froth from each cell was collected for 8 minutes. Finally, the concentrate sample and the tail sample were weighed and then chemically analyzed in order to determine their properties and contents.

Table 2 presents the flotation test results obtained when the cationic polymers A and B as depressants for insoluble matters in the copper/molybdenum flotation using rougher concentrate. The results demonstrated that a depressant dosage of 400 g/ton was able to improve the copper grade in concentrate when compared with a control test (conducted without any depressant) from 23.7% to around 29%, while the copper recovery was around 89%. Additionally, the results demonstrated that this process was able to improve the zinc grade in the concentrate when compared with a control test (conducted without any depressant) from 3.87% to around 4.55% or 4.8%. In this cleaner flotation process with the depressants A and B, the insoluble in concentrate was reduced from 10.1% to 5.5-5.7%, and as a result the copper concentrate was significantly purified. With addition of depressants, the Fe, As, and F levels in the concentrate were reduced to levels that could be a beneficial to potential users of said depressants, as, in some instances, penalties may be incurred if Fe, As, and F levels in the concentrate are higher than a predetermined level. Based upon the results of the present example, the addition of depressant in a cleaner stage may potentially reduce the chemical usage necessary in the rougher stage, thereby presenting a savings in overall the cost for potential users of said depressants. The results of the present example demonstrated that A and B were found to be effective depressants for depressing insoluble matters and improving the separation efficiency of copper/molybdenum flotation processes.

TABLE 3

FLOTATION RESULTS OF DIFFERENT DEPRESSANTS ON THE COPPER FLOTATION IN THE CLEANER STAGE

| De-pressant | Dosage (g/ton) | Final Concentrate % | | | | | | | Recovery % | | | | | | |
|---|---|---|---|---|---|---|---|---|---|---|---|---|---|---|---|
| | | Cu | Ag (ppm) | Fe | As | Zn | Insoluble | F (ppm) | Cu | Ag | Fe | As | Zn | Insoluble | F |
| Control | 0 | 23.69 | 225.81 | 26.19 | 1.14 | 3.87 | 10.12 | 699.06 | 93.31 | 87.72 | 17.21 | 87.48 | 97.30 | 12.85 | 15.71 |
| A | 400 | 28.29 | 235.88 | 26.07 | 0.83 | 4.55 | 5.50 | 289.79 | 89.61 | 78.29 | 14.41 | 58.30 | 4.68 | 4.68 | 4.54 |
| B | 400 | 29.64 | 253.03 | 22.03 | 0.86 | 4.80 | 5.67 | 344.10 | 88.49 | 77.28 | 9.64 | 56.57 | 3.07 | 3.07 | 3.69 |

In the preceding procedures, various steps have been described. It will, however, be evident that various modifications and changes may be made thereto, and additional procedures may be implemented, without departing from the broader scope of the exemplary procedures as set forth in the claims that follow.

The invention claimed is:

1. A metal purification process wherein one or more desired metals are recovered in more concentrated form from an impure metal containing composition comprising the desired metal and insoluble silicate and/or clay mineral contaminants, wherein said purification process includes a flotation step which includes the addition of an amount of at least one cationic polymer, wherein said flotation step is a direct flotation step, wherein said at least one cationic polymer has a molecular weight (MW) in the range of 200,000-2,000,000, wherein said added amount of cationic polymer functions as a depressant (cationic polymer depressant) that substantially prevents the flotation of insoluble silicates and/or clay minerals in the composition, and further wherein the recovered one or more desired metals are selected from copper, molybdenum, gold, zinc, lead, nickel, niobium, platinum, palladium, rhodium, ruthenium, iridium, and osmium; and said cationic polymer depressant comprises or consists of a cationic polyacrylamide copolymer comprising a polyacrylamide backbone produced by copolymerizing acrylamide with at least one cationic monomer, a cationic methacrylamide copolymer comprising a methacrylamide backbone produced by copolymerizing methacrylamide with at least one cationic monomer, polyamine, or polyDADMAC.

2. The process of claim 1, wherein:
(i) the cationic polymer depressant is a cationic polyacrylamide having a molecular weight (MW) in the range of 200,000-2,000,000 g/mol;
(ii) the cationic polymer depressant is a cationic acrylamide- or methacrylamide-based polymer having an average molecular weight (MW) in the range of 400,000-2,000,000 g/mol;
(iii) the cationic polymer depressant is a cationic acrylamide- or methacrylamide-based polymer produced by copolymerizing acrylamide or methacrylamide with a cationic monomer, wherein the cationic monomer is selected from the group consisting of methacryloyloxyethyl-trimethylammonium chloride, acryloyloxyethyl-trimethyl ammonium chloride, methacrylamidopropyltrimethylammonium chloride, acrylamidopropyltri methyl-ammonium chloride, diallyldimethylammonium chloride, dimethylaminoethyl acrylate, dimethylaminoethyl methacrylate, dimethylaminopropylacrylamide, and dimethylaminopropylmethacrylamide;
(iv) the cationic polymer depressant is a acrylamide- or methacrylamide-based polymer comprising a copolymer of acrylamide or methacrylamide with methacryloyloxyethyltrimethyl ammonium chloride optionally containing other monomers, with the proviso its net charge is cationic and comprising an acrylamide/methacrylamide backbone;
(v) the cationic polymer depressant is a acrylamide or methacrylamide based polymer which is rendered cationic after polymerization by an aftertreatment, and optionally wherein said aftertreatment comprises Hofmann or Mannich reactions;
(vi) the cationic polymer depressant is the acrylamide or methacrylamide-based polymer comprising (meth) acryloyloxyethyltrimethyl ammonium chloride, optionally containing other monomers, as long as its net charge is cationic and it has an acrylamide/methacrylamide backbone; or
the cationic polymer depressant comprises any combination of any of the foregoing.

3. The process of claim 1, wherein the composition comprising the desired metal is an ore comprising the desired mineral and gangue which comprises insoluble silicate and/or clay mineral contaminants.

4. The process of claim 3, wherein the gangue comprises any one or more of the following contaminants: insoluble silicates; carbonates; sulfides; clay; oxides of aluminum, oxides of iron, silica, quartz, titanium, sulfur and alkaline earth metals; amphibole, talc, quartz, muscovite, sericite, biotite, chlorites, pyrite, feldspar, mica, clinocloro, and serpentine.

5. The process of claim 3, wherein:
(i) the cationic polymer depressant is a cationic acrylamide- or methacrylamide-based polymer further comprising sulfonated polyacrylamide;

(ii) the cationic polymer depressant is the cationic acrylamide- or methacrylamide-based polymer further comprising partially hydrolyzed acrylamide;

(iii) the cationic polymer depressant is the cationic acrylamide- or methacrylamide-based polymer comprising one or more cationic monomers selected from: dialkylaminoalkyl acrylates and methacrylates and their quaternary or acid salts, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts, acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldialkylammonium halides, diallyldiethylammonium chloride, and diallyldimethyl ammonium chloride;

(iv) the cationic polymer depressant comprises a cationic polyacrylamide having a molecular weight (MW) in the range of 200,000-2,000,000 g/mol;

(v) the cationic polymer depressant is a cationic acrylamide- or methacrylamide-based polymer having an average molecular weight (MW) in the range of 400,000-2,000,000 g/mol;

(vi) the cationic polymer depressant is a cationic acrylamide- or methacrylamide-based polymer produced by copolymerizing acrylamide or methacrylamide with a cationic monomer, wherein the cationic monomer is selected from the group consisting of methacryloyloxyethyl-trimethylammonium chloride, acryloyloxyethyltrimethyl ammonium chloride, methacrylamidopropyltrimethylammonium chloride, acrylamidopropyltri methyl-ammonium chloride, diallyldimethylammonium chloride, dimethylaminoethyl acrylate, dimethylaminoethyl methacrylate, dimethylaminopropylacrylamide, and dimethylaminopropylmethacrylamide;

(vii) the cationic polymer depressant is a cationic acrylamide- or methacrylamide-based polymer comprising a copolymer of acrylamide or methacrylamide with methacryloyloxyethyltrimethyl ammonium chloride optionally containing other monomers, with the proviso its net charge is cationic and comprising an acrylamide/methacrylamide backbone;

(viii) the cationic polymer depressant is a cationic acrylamide or methacrylamide based polymer which optionally is rendered cationic after polymerization by an aftertreatment, and optionally wherein said aftertreatment comprises Hofmann or Mannich reactions;

(ix) the cationic polymer depressant is synthesized by using a controlled molecular weight cationic polyacrylamide polymerized within a coagulant matrix comprising one or more of [3-(methacryloylamino)propyl] trimethylammonium chloride (MAPTAC), polydiallyldimethylammonium chloride (poly-DADMAC), polyamine, polyyinylamine, dimethylaminoethylacrylate methyl chloride or any of their mixtures;

(x) the cationic polymer depressant is a cationic acrylamide or methacrylamide-based polymer comprising (meth)acryloyloxyethyltrimethyl ammonium chloride, optionally containing other monomers; or any combination of the foregoing.

6. The process of claim 1 wherein the cationic polymer depressant is polyDADMAC and the molecular weight of polyDADMAC is as high as one million.

7. The process of claim 1 wherein (i) the cationic polymer depressant consists of repeating units of epichlorohydrin, dimethylamine and ethylenediamine monomers, (ii) the cationic polymer depressant comprises from 0.1 to 99.9 mole percent of each of said monomers, and (iii) said cationic polymer depressant is used optionally in combination with a collector comprising one or more xanthates.

8. The process of claim 1, wherein the recovered metals comprise copper and/or molybdenum.

9. The process of claim 1, wherein the cationic polymer depressant consists of a cationic polyacrylamide or poly-DADMAC.

10. The process of claim 1, wherein said cationic polymer depressant is present at a concentration of 10-1000 grams per ton of said ore.

11. The process of claim 1, wherein the metal which is recovered in more concentrated form is in the form of a metal sulfide.

12. The process of claim 1, wherein the metal which is recovered in more concentrated form comprises copper.

13. The process of claim 1, wherein the metal which is recovered in more concentrated form comprises copper and the process allows for the recovery of copper from copper ore such that the percentage of recovered copper is at least 88% or more.

14. The process of claim 1, wherein the metal which is recovered in more concentrated form comprises molybdenum and the process improves the grade of molybdenum from molybdenum containing ore such that the grade of the recovered molybdenum is at least 1% or more.

15. The process of claim 1, wherein the metal which is recovered in more concentrated form comprises molybdenum and the process allows for the recovery of molybdenum from molybdenum-containing ore such that the percentage of recovered molybdenum is at least 97.6%.

16. The process of claim 1, wherein the metal which is recovered in more concentrated form comprises zinc and the process improves the grade of zinc from the zinc containing ore such that the grade of the recovered zinc is at least 2% or more.

17. The process of claim 1, wherein the amount (percent by weight) of insoluble contaminants in the impure metal containing composition ranges from 1% to 70%.

18. The process of claim 1, wherein prior to the addition of the at least one cationic polymer, the impure metal containing composition is formulated as an ore-water slurry having a pH ranging from about 7 to about 12, about 9 to about 12, or about 10 to about 12.

* * * * *